United States Patent [19]

Hedberg et al.

[11] Patent Number: 4,847,868
[45] Date of Patent: Jul. 11, 1989

[54] NON-COHERENT PATTERN DETECTION

[75] Inventors: Dave Hedberg, Danville; Paul Hurst, Yolo; Steve Levy, Nevada City, all of Calif.

[73] Assignee: Silicon Systems, Inc., Tustin, Calif.

[21] Appl. No.: 158,766

[22] Filed: Feb. 22, 1988

[51] Int. Cl.$^4$ .......................... H03K 9/00; H04L 27/06
[52] U.S. Cl. ...................................... 375/75; 375/115; 455/226
[58] Field of Search ........................ 375/13, 75, 76, 80, 375/81, 83, 87, 96, 1, 115; 329/135; 455/67, 226; 370/107

[56] References Cited

U.S. PATENT DOCUMENTS

| | | | |
|---|---|---|---|
| 4,227,255 | 10/1980 | Carrick et al. | 455/67 |
| 4,247,939 | 1/1981 | Stromswold et al. | 455/303 |
| 4,433,425 | 2/1984 | de Jaeger | 375/13 |
| 4,466,108 | 8/1984 | Rhodes | 375/97 |
| 4,517,680 | 5/1985 | Betts et al. | 375/75 |

Primary Examiner—Robert L. Griffin
Assistant Examiner—Stephen Chin
Attorney, Agent, or Firm—Hecker & Harriman

[57] ABSTRACT

The present invention is directed to a digital non-coherent pattern detection scheme in which spectral analysis of phase encoded signals is utilized to provide pattern recognition. The present invention is relatively insensitive to the power level of incoming signals. Since the power level is easily detected and determined, the present invention allows the various algorithms to operate quickly. Further, utilizing the magnitude samples of the incoming signal result in a pattern detection scheme that is independent of modulation technique. The present invention utilizes the concept of spectral analysis to determine spectral lines which are present in phase encoded signals. A phase encoded signal such as a DPSK or QAM having an implicit pattern contained therein, which results in unique spectral lines. By detecting the spectral lines in certain combinations, the phase encoded pattern being sent may be identified. For example, "unscrambled mark", "S1", and other patterns may be identified using the method of the present invention. In operation, a plurality of receive channels are implemented to detect energy levels at specific frequencies and thereby identify spectral lines. The input signal is demodulated with one of a plurality of modulating frequencies $F_0$–$F_n$ in each receive channel, chosen to translate the input spectra signal to baseband. The demodulated signal is low pass filtered and the filtered output is squared, generating a power signal. In the preferred embodiment, the power signal is filtered again to obtain a stochastic average. This averaged signal is coupled to an energy detect block. If energy at the desired spectra is present and of sufficient magnitude, a digital "one" is provided as output, if sufficient energy is detected, a digital "zero" is provided as output. A logical "one" is provided at the output representing the specific pattern detected as indicated by the digital word.

14 Claims, 1 Drawing Sheet

FIG. 1
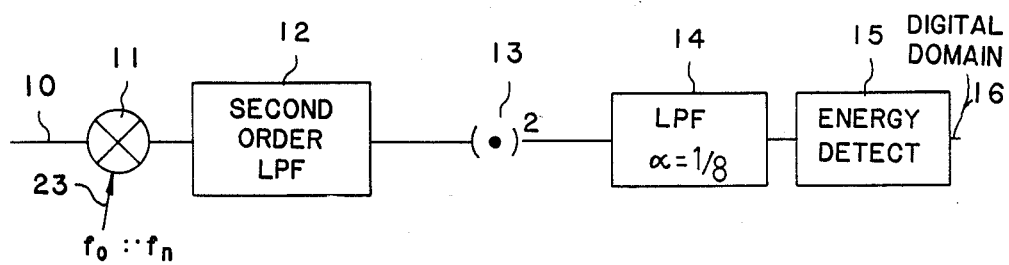
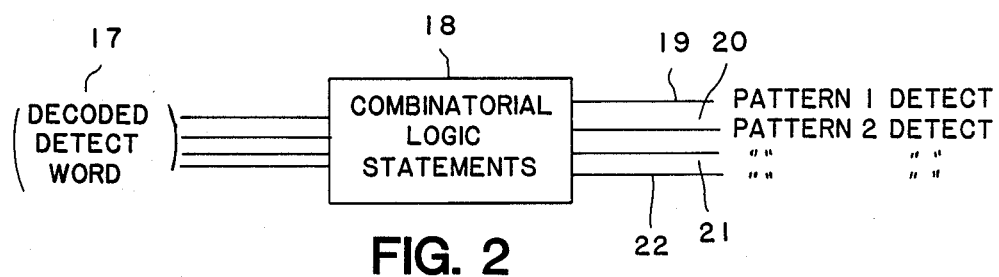
FIG. 2
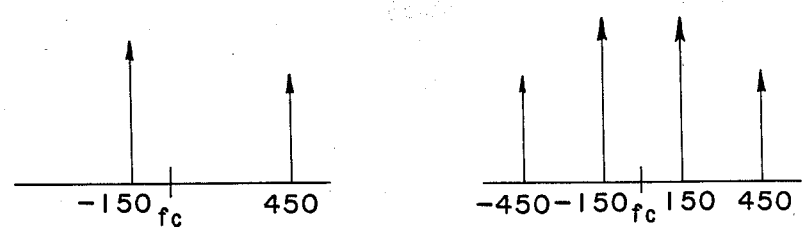
FIG. 3A    FIG. 3B
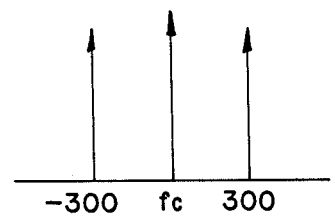    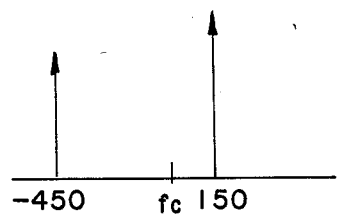
FIG. 3C    FIG. 3D

NON-COHERENT PATTERN DETECTION

BACKGROUND OF THE INVENTION

1. Field of the Invention

This invention relates to the field of phase encoded pattern recognition and the use of digital techniques to perform spectral analysis on phase encoded signals.

2. Background Art

Communication of data information on the voice network between a sending and receiving station is typically accomplished with a modem (modulator/demodulator). A modem transforms digital information by modulating it according to a well known modulating scheme. This modulated data is transmitted to a receiving modem, where it is demodulated to produce the original information. During the transmission of data from a transmitting modem to a receiving modem, a series of phase encoded tones are utilized to provide set up information to the modems. These tone sequences represent data patterns and are known as "hand shake" sequences. One particular hand shake sequence is known as the V.22 bis modem handshake sequence. In order to receive the hand shake signals, it is necessary to acquire, detect and decode the hand shake sequence. The hand shake sequence typically consists of phase encoded information.

In the prior art, a coherent, or clock recovered, detection scheme is utilized. These prior art detection schemes suffer from the time required to acquire the large dynamic range found during the hand shake sequence. In addition, prior art detection schemes are dependant on the particular modulation technique utilized and are therefore algorithm dependant. Further, prior art coherent pattern detection schemes, because they are dependant on the modulation technique, so not operate effectively or quickly in a noisey environment. Thus, coherent-detection requires a large amount of code to detect the various signals. In addition, the coherent technique requires more time to require the desired pattern.

Therefore, it is an object of the present invention to provide a fast method for pattern detection.

It is another object of the present invention to provide a method of pattern detection which is not hardware or firmware intensive.

It is yet another object of the present invention to provide a method of recovery which does not require a data clock.

SUMMARY OF THE INVENTION

The present invention is directed to a digital non-coherent pattern detection scheme in which spectral analysis of phase encoded signals is utilized to provide pattern recognition. The present invention is relatively insensitive to the power level of incoming signals. Since the power level is easily detected and determined, the present invention allows the various algorithms to operate quickly. Further, utilizing the magnitude samples of the incoming signal result in a pattern detection scheme that is independent of modulation technique. The present invention utilizes the concept of spectral analysis to determine spectral lines which are present in phase encoded signals. A phase encoded signal such as a DPSK or QAM having an implicit pattern contained therein, results in unique spectral lines. By detecting the spectral lines in certain combinations, the phase encoded pattern being sent may be identified. For example, "unscrambled mark", "double dotting (S1)", and other patterns may be identified using the method of the present invention.

In operation, a plurality of receive channels are implemented to detect energy levels at specific frequencies and thereby indentify spectral lines. The input signal is demodulated with one of a plurality of modulating frequencies $F_0$-$F_n$ in each receive channel, chosen to translate the input spectra signal to baseband. The demodulated signal is low pass filtered and the filtered output is squared, generating a power signal. In the preferred embodiment, the power signal is filtered again to obtain a stochastic average. This averaged signal is coupled to an energy detect block. If energy at the desired spectra is present and of sufficient magnitude, a digital "one" is provided as output, if insufficient energy is detected, a digital "zero" is provided as output. The digital values from all channels are combined into a digital word and provided as input to a decode logic block. The logic block has a plurality of outputs, each representing a specific pattern. A logical "one" is provided at the output representing the specific pattern detected as indicated by the digital word.

BRIEF DESCRIPTION OF THE DRAWINGS

FIG. 1 is a block diagram illustrating a time multiplexed receive channel.

FIG. 2 is a blcok diagram illustrating the preferred embodiment of the present invention.

FIGS. 3A-3D are spectral representations of non-coherent patterns detected by the present invention.

DETAILED DESCRIPTION OF THE PRESENT INVENTION

The method and apparatus for digital non-coherent patterns is described. In the following description, numerous specific details, such as spectral values, freuqencies, etc., are set forth in order to provide a more thorough description of the present invention. It will be obvious, however, to one skilled in the art, that the present invention may be practiced without these specific details. In other instances, well known features have not been described in detail in order not to unnecessarily obscure the present invention.

The present invention is directed to a digital non-coherent pattern detectio scheme in which spectral analysis of phase encoded signals is utilized to provide pattern recognition. In operation, a plurality of receive channels are implemented to detect energy at specific frequencies and thereby identify spectral lines. The input signal is demodulated with one of a plurality of modulating frequencies $F_0$-$F_n$ in each receive channel, chosen to translate the input spectra signal baseband. The demodulated signal is low pass filtered and the filtered output is squared, generating a power signal. In the preferred embodiment, the power signal is filtered again to obtain a stochastic average.

The present invention is insensitive to the power level of incoming signals. Further, the scheme utilizes the magnitude samples thus providing a pattern detection scheme that is independent of modulation techniques and alogrithm. A phase encoded signal such as DPSK of QAM signal having an implicit pattern contained therein, results in unique spectral lines with energy at specific, detactable frequencies. By detecting the spectral lines in certain combinations, the phase encoded pattern being sent may be identified. For example, "unscrambled mark", "double dotting (S1)", and other patterns may be identified using the method of the present invention.

The averaged signal is coupled to an energy detect block. If energy at the desired spectra is present and of sufficient magnitude, a digital output of one is provided as output. The digital values from all channels are combined into a digital word and provided as input to a decode logic block. The logic block has a plurality of outputs, each representing a specific pattern. A logical "one" is provided at the output representing the specific pattern desired as indicated by the digital input word.

A time multiplexed receive channel such as is used in the preferred embodiment of the present invention is illustrated in FIG. 1. The input signal 10 is inputted to a fixed demodulator 11 along with a specific modulating frequency. The modulating frequency is selected to allow the detection of power corresponding to specific spectral lines. Therefore, a plurality of modulating frequencies are necessary to permit the detection of a plurality of spectral lines. Thus, the present invention contemplates a plurality of channels such as the channel of FIG. 1 with one of modulating frequencies $F_0$-$F_n$ applied to the fixed demodulator in each channel. In the preferred embodiment, the multiplexing is accompanied by the calling of a routine multiple times with different modulating frequencies $F_0$-$F_n$.

The output of demodulator 11 is provided to a low pass filter 12 which in the preferred embodiment is a second order low pass filter. The output of low pass filter 12 is squared at multiplier 13. The squared signal represents a power level of the input signal. The power signal provides a stable reference point that is independent of the particular modulation technique being used and results in an algorithm independent detection scheme.

The power signal is provided to low pass filter 14. In the preferred embodiment, the filter 14 is used to obtain a stochastic average of the power input levels. In the preferred embodiment, samples at the rate of one each 1.66 msec are utilized. The output of low pass filter 14 is provided to energy detect 15. Energy detect 15 looks for the presence or absence of energy at specific frequencies and outputs a digital signal 16 which has a logical value of "1" or "0" depending on the presence or absence of energy. The output of energy detect 15 for each channel is combined into a multi-bit decode detect word 17. In the preferred embodiment of the present invention decode detect word 17 is a four bit word. Referring to FIG. 2, decode detect word 17 is inputted to logic block 18. Depending upon the value of the detect word 17, logic block 18 outputs a logical "1" or "0" on output lines 19-22, with each of output lines 19-22 representing a unique pattern.

Referring to FIGS. 3A-3D, a number of examples of non-coherent patterns spectra are illustrated. For example, FIG. 3A is a pattern known as "unscrambled mark". In FIGS. 3A-3D, the base line represents frequency with FC being the carrier frequency. For unscrambled mark, energy is detected at negative 150 Hz and plus 450 Hz values with the energy at negative 150 Hz being greater than the energy at 450 Hz. Unscrambled mark represents a transmitted "1111". FIG. 3B illustrates the spectrum which represents a transmitted "0110". This pattern has spectral line energy at plus and minus 150 Hz and at plus and minus 450 Hz.

FIG. 3C illustrates a pattern known as "double dotting (S1)" representing a transmitted "0011". The S1 pattern has energy at plus and minus 300 Hz and at DC. FIG. 3D represents a pattern known as "unscrambled space" representing a transmitted "0000". Unscrambled space has energy at minus 450 Hz and plus 150 Hz.

Referring to FIG. 1, a single receive channel is implemented in the preferred embodiment of the present invention. In this embodiment, the modulating frequency 23 has values between $F_0$ and $F_n$. The modulating function is such that it translates the input spectra signal to base band. The output of the demodulator 11 is low pass filtered at filter 12. The output of filter 12 is squared to obtain the magnitude which is a power signal and this power signal is filtered again at low pass filter 14 so as to achieve a stochastic average. Although only a single channel is shown, it will be appreciated that N channels are utilized in the present invention. In the preferred embodiment, four channels are implemented so as to output a four bit digital word from the energy detect block 15.

The logic block 18 has an implicit filter which is frequency spectral line dependant. In other words, if there is a certain pattern that is being monitored, and there are spectral values which would otherwise prevent the detection of the pattern, these values are filtered out. On the other hand, if the acquisition of a pattern is attempted when spectral content is conflicting (too many tones), no pattern is recognized (probably noise). The allows the present invention to detect unscrambled patterns in a scrambled transmission environment. Because it is working as part of a scrambled transmission environment, false spectral lines may occur. Therefore, the filter implementation of the logic block removes many of the "false" spectral lines so that the unscrambled patterns may be detected.

In the preferred embodiment of the present invention, four channels are implemented for detecting energy at frequencies necessary for detection of the desired patterns. In this embodiment, the channels detect energy at negative 150 Hz, negative 175 Hz,(for DPSK applications), D.C., and positive 300 Hz. Referring to FIGS. 3A-3D, it can be seen that it is not necessary to detect energy at 450 Hz because only patterns having energy at negative 150 Hz also have energy at 450 Hz. However, it will be obvious that if desired, energy may be detected at all frequencies of interest by providing a sufficient number of channels. Further, although only a few examples of patterns are illustrated, it will be obvious that any patterns may be detected by providing the proper number and kind of channels to detect energy at suitable frequencies.

Thus, a method and apparatus for digital non-coherent pattern detection has been described.

We claim:

1. A circuit for detecting and identifying scrambled and unscrambled non-coherent patterns in an input signal comprising:

at least one receiving channel for receiving said input signal and detecting one of a plurality of spectral lines;

said receiving channel comprising demodulating means coupled to said input signal and to one of a plurality of modulating signals, said demodulating means translating said input signal to a baseband signal;

first filter means coupled to said baseband signal for filtering said baseband signal and providing a first output in a desired frequency range;

squaring means coupled to said first output for squaring said first output and providing a power signal;

second filter means coupled to said power signal for filtering and averaging said power signal, said second filter means providing a second output having a magnitude;

detection means coupled to said second output for outputting a digital signal when said magnitude of said second output is greater than a desired level;

decoding means coupled to said digital signal for decoding said digital signal and providing one of a plurality of pattern detect signals depending on the value of said digital signal.

2. The circuit of claim 1 wherein said first filter means comprises an nth order low pass filter.

3. The circuit of claim 1 having muliple receiving channels.

4. The circuit of claim 3 wherein each of said receiving channels provides a digital signal to said decoding means such that said digital signals comprise a multiple bit digital word.

5. The circuit of claim 1 wherein said digital signal comprises a first logical value when said magnitude exceeds said desired level and a second logical value when said magnitude is less than said desired level.

6. A circuit for detecting and identifying scrambled and unscrambled non-coherent patterns of an input signal comprising:

a plurality of receiving channels for receiving said input signal and detecting one of a plurality of spectral lines;

each of said receive channels comprising;

demodulating means coupled to said input signal and to one of a plurality of modulating frequencies, said demodulating means translating said input signal to a baseband signal;

first filter means coupled to said baseband signal for filtering said baseband signal and providing a first output signal in a desired frequency range;

squaring means coupled to said first output signal for squaring said first output signal and providing a power signal;

second filter means coupled to said power signal for filtering and averaging said power signal and providing a second output signal having a magnitude;

detection means coupled to said second output signal for detecting said magnitude of said second output signal and providing a digital signal having a logical value dependent on said magnitude of said second output signal;

combining means coupled to said digital signal from each of said receiving channels for combining said digital signals into a digital word;

decoding means coupled to said digital word for decoding said digital word and providing one of a plurality of outputs dependent on a value of said digital word, each of said plurality of outputs representing one of said plurality of patterns.

7. The circuit of claim 6 wherein said plurality of receiving channels comprises four.

8. The circuit of claim 7 wherein said digital word comprises a four bit digital word.

9. The circuit of claim 6 wherein said first filter means comprises a second order low pass filter.

10. A method for detecting a plurality of scrambled and unscrambled non-coherent patterns of an input signal comprising the steps of:

modulating said input signal with a modulating function to translate said input signal to a baseband signal;

filtering said baseband signal to provide a first output signal in a desired frequency range;

generating a power signal from said first output signal;

averaging said power signal over a first number of samples and providing a second output signal having a magnitude;

detecting said magnitude and providing a digital signal having a first logical value when said magnitude is greater than a desired level;

decoding said digital signal and providing one of a plurality of pattern detect signals depending on the value of said digital signal, each of said pattern detect signals representing one of said plurality of said patterns.

11. The method of claim 10 further including performing the steps of claim 10 for a plurality of modulating function such that a plurality of said digital signals are provided and combining said plurality signals into a digital word.

12. The method of claim 11 wherein said digital word is provided to said decoding means.

13. The method of claim 10 wherein said step of generating said power signal is performed by squaring said first output signal.

14. The method of claim 10 wherein said step of averaging said power signal is performed by low pass filtering four samples of said power signal.

* * * * *